United States Patent Office
3,274,476
Patented Sept. 20, 1966

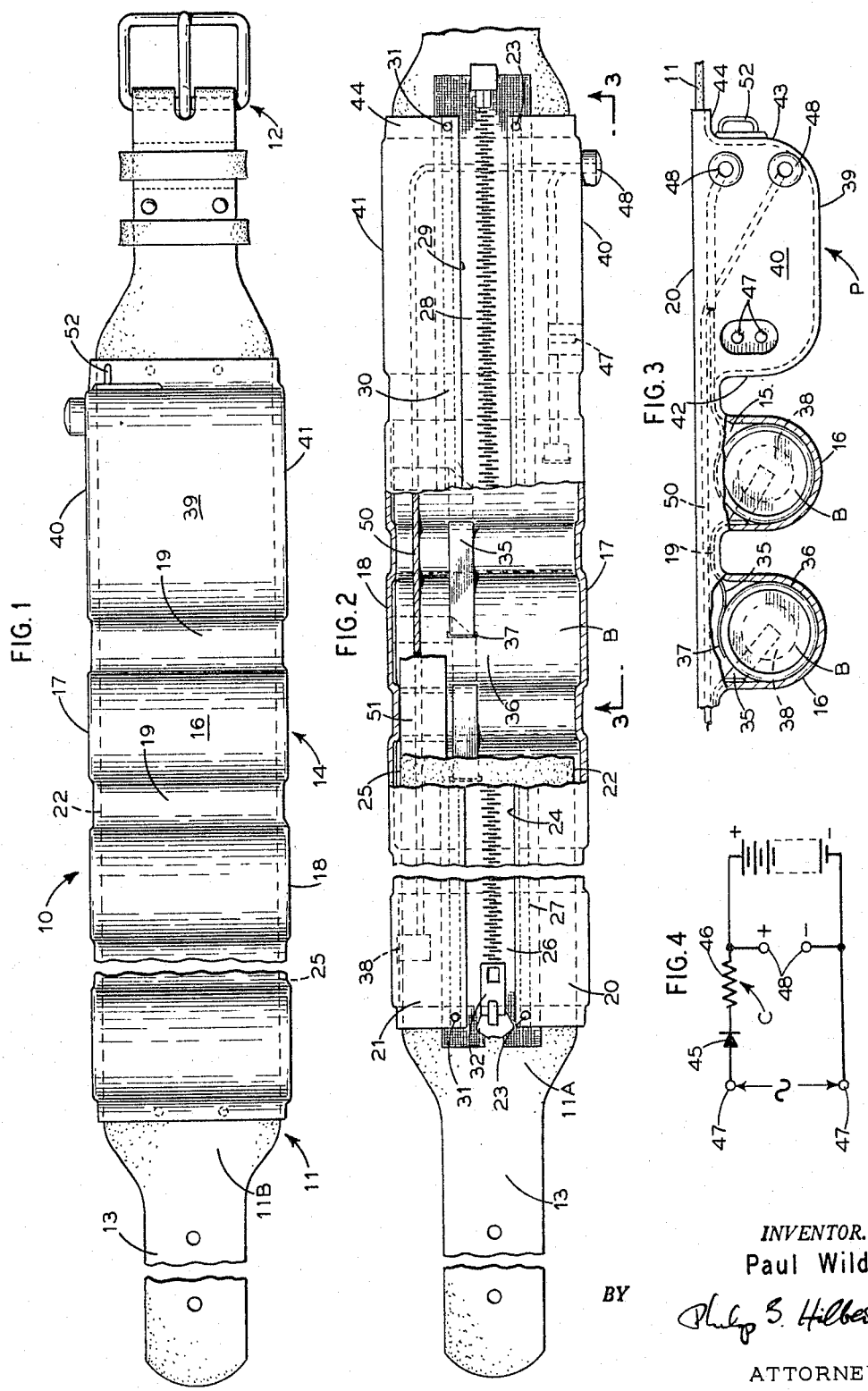

3,274,476
ARTICLE CARRYING BELT
Paul Wildum, 450 West End Ave., New York, N.Y.
Filed Oct. 30, 1963, Ser. No. 320,065
10 Claims. (Cl. 320—2)

This invention relates to an article carrying belt and more particularly concerns a belt construction adapted to carry an electric power supply in the form of electric cells.

It is frequently desirable to operate electrically actuated devices under conditions where the usual electric power line supply is not available for plug-in or other connection to such devices. In such cases, the device must be provided with its own power supply in the form of dry cells, storage battery or generator. Such power supplies are necessarily bulky, heavy and inconvenient in use, particularly when the device to be operated is of a portable nature, such as tools, motion picture cameras and the like.

Recently, there has been provided improved power supplies in the form of relatively small rechargeable cells which are adapted to supply electric current to motors and motor operated devices of a portable nature; such cells being compact in size and bulk and of reduced weight.

Accordingly, an object of this invention is to provide an improved belt construction which is to be worn about the waist of the operator of a given electrically actuated device; said belt construction being adapted to carry a plurality of electric cells which may be of the rechargeable type, for powering the electrically actuated device.

Another object of this invention is to provide an improved belt for carrying an electric power supply of the character described, such belt providing means for uniformly distributing the weight and bulk of the power supply about the waist of the wearer to obtain maximum comfort in use and to permit use of the same for extended periods of time without discomfort.

A further object of this invention is to provide an improved belt construction of the character described which includes means for permitting quick removal and replacement of one or more of the electric cell units.

Still another object of this invention is to provide a power supply belt including provision for a self contained charging unit for recharging the rechargeable cell units carried by the belt.

Yet another object of this invention is to provide a belt construction of the character described, wherein the belt is formed of premolded plastic material of minimal thickness and bulk yet highly resistant to wear and abrasion.

Other objects of this invention will in part be obvious and in part hereinafter pointed out.

In the drawing, FIG. 1 is a front elevational view of a belt construction embodying the invention;

FIG. 2 is a rear elevational view thereof, with parts broken away and parts in section;

FIG. 3 is a sectional view taken on the line 3—3 of FIG. 2, with parts broken away and parts in section; and FIG. 4 is a circuit diagram for the interconnected components carried by the belt construction.

Essentially, the belt construction of the instant invention comprises a premolded plastic structure providing adjacent compartments for carrying therein individual articles such as electric cells or the like, such molded plastic structure being associated with a belt for extending about the waist of the wearer and thereby support and distribute the weight of the articles carried in the compartments; together with means for quickly and readily opening and closing the molded plastic structure for the purpose of removing and replacing individual articles.

Thus, as shown in FIGS. 1–3, 10 designates an article carrying belt embodying the invention. For the purpose of illustration, such belt is particularly adapted to carry a plurality of unitary electric cells which may be of the rechargeable type, for powering a portable electrically actuated device such as power tools, motor operated motion picture cameras, and the like, as well as bringing a source of electrical energy to stationary devices for test purposes, such as electric meters or the like.

The belt 10 comprises a flat, elongated belt member 11 which may be of leather or other suitable material, said member terminating at one end in a conventional buckle structure 12 and at the other end in the usual perforated tongue portion 13, which permits belt member 11 to be worn about the body in a conventional manner.

Means is provided for forming a series of longitudinally adjacent compartments on said belt member 11 for carrying individual articles such as batteries or the like. To this end there is mounted on belt member 11 a molded, pocketed plastic structure generally indicated at 14. Structure 14 is formed of sheet plastic such as vinyl copolymer or vinyl chloride of suitable gauge.

The structure 14 is unitary and includes a series of longitudinally adjacent pockets or compartments 15; each compartment being defined by a part cylindrical wall portion 16, a top wall 17, a bottom wall 18 and narrow web portions 19 interconnecting the adjacent side wall portions 16. Extending from top walls 17 and the upper portions of web portions 19 is a longitudinally extending strip portion 20 and similarly, a strip portion 21 extends longitudinally and integrally connected to bottom walls 18 and the lower portions of web portions 19.

The strip portion 20 is folded about the upper edge 22 of belt member 11 and brought into contact with the rear surface 11A of said belt member 11, being secured in place at the opposite ends thereof by rivets 23. The free edge 24 of strip portions 20 is located somewhat short of the longitudinal median line of belt member 11. The strip portion 21 is folded about the bottom edge 25 of belt member 11 and extends in contact with the rear surface 11A thereof toward the strip portion 20.

A zipper element bearing tape 26 is secured between the free edge of strip portion 20 and the rear surface 11A of belt member 11 by stitching 27 and rivets 23. A similar zipper element bearing tape 28 is secured to the free edge 29 of strip portion 21 by stitching 30 and rivets 31 at the ends thereof. Thus, strip portion 20 and its associated zipper element bearing tape 26 are fixedly secured to belt member 11 by said stitching 27 and rivets 23 whereas strip portion 21 and its associated zipper element bearing tape 28 may be peeled away from the back surface 11A of belt member 11, for the purpose later indicated.

A slide fastener 32 engages the zipper elements on adjacent tapes 26, 28 to bring the edges thereof together in interengaged relation, and thereby locate the web portions 19 of molded structure 14 closely adjacent to the front surface 11B of belt member 11, which surface is effective to close the compartments formed by side wall portions 16, top walls 17 and bottom walls 18.

By way of illustration, belt 10 may be used to carry individual, rechargeable batteries of the known nickel-cadmium type, indicated at B. Each battery B is deposited in a compartment 15 by operating slide fastener 32 to disconnect tape 28 from tape 26 and to allow strip portion 21 to be peeled back away from belt member 11. This exposes the compartments 15 for receiving therein the batteries B.

The batteries B are wired together in series by metal connector strips 35 which may be soldered at one end to the negative metal casing 36, as at 37 of one such battery and at the other end to the positive pole 38 of the next adjacent battery.

As batteries B are of the rechargeable type, a diode type charger unit C is provided and disposed in a pocket indicated at P which is an integral part of premolded structure 114, being located at the end thereof adjacent buckle structure 12. Pocket P is defined by side wall portion 39, top wall 40 and bottom wall 41, end walls 42, 43 and a narrow end web portion 44 extending from end wall 43.

The charger unit C is of a known type including a diode element 45, a limiting resistor 46, power input terminals 47 and power output socket type terminals 48. The input terminals 47 are exposed through a cut out in top wall 40 of pocket P and terminals 48 also extend through said top wall 40 for ready access.

The negative terminal of the end battery B adjacent the tongue portion 13 of belt member 11 is electrically connected by a wire 50 extends along the length of strip portion 21 and is in turn connected to the negative output terminal of socket terminals 48. The positive terminal of the battery B adjacent charger unit C is directly connected to the charger unit C by way of resistor 46 and to the positive output terminal of socket terminals 48. An insulating tape 51 overlies the insulated wire 50 and holds the same in place against batteries B and the intervening web portions 19.

A keeper member 52 is secured to the end wall 43 of pocket P for receiving a removable latch member, not shown, which may be mounted on the leading end of power supply leads, not shown, which are to be inserted into the socket type output terminals 48, to retain such leads in place without accidental disconnection thereof. The electrical connections as between batteries B, charger unit C and the input and output terminals, is shown in FIG. 4.

It will be apparent that a selected number of batteries B may be inserted in compartments 15 for serial connection to provide the desired voltage for the power supply. The batteries B are well sealed in their compartments by the belt member 11 and the interconnected zipper tapes 26, 28, with a uniform distribution of such battery units about the length of belt member 11.

Connections between said batteries B and a given electrically operated device, not shown, is readily made by power leads from such device having pin terminals which may be inserted in the output terminal sockets 48. When the batteries B require recharging, a charging lead, not shown, having a socket connector at one end, is inserted into the pin terminals 47 on charger unit C and the other end of said lead is connected to the usual supply of A.C. current, not shown.

While the material from which pocketed structure 14 is molded, may be of relatively small gauge, the molded part cylindrical side portions 16, top walls 17, bottom walls 18 and web portions 19 in combination, serve to provide a structure having a high degree of strength and resistance to deformation and abrasion.

It is understood that articles other then batteries B may be carried in pockets P of belt 10.

The sheet plastic, of polyvinyl chloride, vinyl copolymer, or the like from which molded structure 14 is formed, may be of a relatively light gauge in thickness. However, the formation of the recesses or pockets 15 therein, including the integrated side wall 16, top wall 17 and bottom wall 18, as well as interconnecting web portions 19, result in a finished molded structure which is not only self sustaining but has substantial strength and is adapted to carry the relatively heavy batteries B.

The recesses 15 may be of varied and desired configuration, which corresponds to the external contours of the particular articles to be carried therein.

As various changes might be made in the embodiment of the invention herein disclosed without departing from the spirit thereof, it is understood that all matter herein shown or described shall be deemed as illustrative and not by way of limitation, except as set forth in the appended claims.

What is claimed is:

1. An article carrying belt comprising an elongated flat belt member having means at the opposite ends thereof for detachably interconnecting the opposite ends of said belt member, means on said belt member forming a plurality of laterally adjacent article holding compartments disposed longitudinally of said belt member between the interconnecting means at the opposite ends thereof, said compartment forming means comprising an elongated molded plastic web, said molded web including a longitudinally extending medial portion formed to provide a plurality of laterally adjacent, individual walled compartments closed at the top, bottom and on one side thereof, the other side thereof being open, and a pair of longitudinally extending marginal portions integral with and extending from opposite sides of said medial portion, each of said marginal portions being folded about the respective side edges of said belt member to locate said medial portion in opposed relation to one side of said belt member, said one side of the belt member closing the open side of each of the walled compartments of said web, means for mounting said molded web on said belt member, the folded marginal portions thereof being disposed in opposed relation to the other side of said belt member, and means for detachably interconnecting the opposed edge portions of the marginal portions of said plastic web whereby one of said marginal portions may be rolled back over one side edge of said belt member to expose the individual compartments for removal of articles therefrom or insertion of articles therein.

2. An article carrying belt as in claim 1, and further including means for fixedly securing one of said marginal portions to said belt member, the other marginal portion upon disconnection from said one marginal portion being movable away from the other side of said belt member.

3. An article carrying belt as in claim 1, wherein said molded element includes narrow web portions between adjacent compartment forming portions, said narrow web portions being disposed in adjacent relation to said narrow one side of the belt member.

4. An article carrying belt as in claim 1 wherein each compartment forming portion includes a part cylindrical side wall, a top wall integral with one end of said side wall, and a bottom wall integral with the other end of said side wall.

5. An article carrying belt comprising an elongated flat belt member, a multi-article carrying means mounted on said belt member, said means comprising an integral, molded plastic, elongated element, said element including a plurality of laterally spaced pocket portions having an open side, disposed longitudinally along a mid-portion thereof, said pocket portions being disposed in opposed relation to one side of said belt member with the open sides thereof closed thereby, said element further including oppositely disposed marginal strip portions respectively extending from opposite ends of said pocket portions, each of said marginal strip portions being folded respectively about the longitudinal edges of said belt member to dispose said strip portions in contact with the other side of said belt member, means for securing one of said marginal strip portions to said belt member, and means for detachably securing the other of said marginal strip portions along the length thereof to said belt member whereby said other marginal strip portion may be peeled away from opposed portions of said belt member to provide for access to said recess portions on said molded element.

6. An article carrying belt as in claim 5 wherein the free longitudinal edges of said marginal strip portions are in opposed adjacent relation, and said detachable securing means comprises interlocking fastener means on said free edges of the marginal strip portions.

7. An article carrying belt as in claim 5 wherein the articles carried in said multi-article carrying means comprise unitary electric batteries respectively located in said pocket portions, means for electrically interconnecting said batteries, and output terminal means on said pocket portions electrically connected to said interconnected batteries.

8. An article carrying belt as in claim 7 wherein said batteries are of the rechargeable type, unitary charging means disposed in one of said pocket portions, electrical conductor means interconnecting said batteries with said charging means, and output terminal means on said charging means.

9. An article carrying belt as in claim 5 wherein each of said pocket portions is defined by a part-cylindrical side wall portion, a top wall portion integral with one end of said side wall portion and a bottom wall portion integral with the other end of said side wall portion, and web portions integral with and interconnecting the side wall portions of adjacent pocket portions.

10. An article carrying belt as in claim 5 wherein said molded plastic element comprises light gauge sheet material and the spaced pocket portions molded therein provides for stiffness in the molded element.

References Cited by the Examiner

UNITED STATES PATENTS

| | | | |
|---|---|---|---|
| 2,351,158 | 6/1944 | Stelzer | 224—5 |
| 2,715,487 | 8/1955 | Christensen | 224—23 |
| 3,142,852 | 8/1964 | Phaneuf et al. | 320—2 X |
| 3,143,697 | 8/1964 | Springer | 320—2 |

JOHN F. COUCH, *Primary Examiner.*

S. WEINBERG, *Assistant Examiner.*